US010042809B2

(12) United States Patent
Choi et al.

(10) Patent No.: US 10,042,809 B2
(45) Date of Patent: Aug. 7, 2018

(54) METHOD FOR COMMUNICATION USING PCI EXPRESS DEDICATED COMMUNICATION MODULE AND NETWORK DEVICE INCLUDING THE SAME

(71) Applicant: Electronics and Telecommunications Research Institute, Daejeon (KR)

(72) Inventors: Won Hyuk Choi, Daejeon (KR); Won Young Kim, Daejeon (KR); Seung Jo Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 149 days.

(21) Appl. No.: 14/954,192

(22) Filed: Nov. 30, 2015

(65) Prior Publication Data

US 2016/0275038 A1 Sep. 22, 2016

(30) Foreign Application Priority Data

Mar. 20, 2015 (KR) .......................... 10-2015-0039009

(51) Int. Cl.
| | | |
|---|---|---|
| G06F 13/42 | (2006.01) | |
| G06F 13/00 | (2006.01) | |
| G06F 13/38 | (2006.01) | |
| G06F 13/36 | (2006.01) | |
| G06F 13/40 | (2006.01) | |

(52) U.S. Cl.
CPC .......... *G06F 13/4282* (2013.01); *G06F 13/36* (2013.01); *G06F 13/4068* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| | | | |
|---|---|---|---|
| 2007/0147390 A1 | 6/2007 | Jung et al. | |
| 2008/0008205 A1 | 1/2008 | Jung et al. | |
| 2008/0148032 A1* | 6/2008 | Freimuth ................ | G06F 13/42 713/1 |

FOREIGN PATENT DOCUMENTS

| | | |
|---|---|---|
| KR | 10-2007-0011503 A | 1/2007 |
| KR | 10-2009-0104137 A | 10/2009 |

(Continued)

*Primary Examiner* — David E Martinez
(74) *Attorney, Agent, or Firm* — Nelson Mullins Riley & Scarborough LLP; Anthony A. Laurentano

(57) ABSTRACT

In a method for communication between hosts using a peripheral component interconnect express (PCIe) dedicated communication module, a PCIe dedicated communication module of a first host generates a first connection buffer for receiving a connection command from a second host, stands by a connection request from the second host, determines whether the first host is connectable to the second host in response to the connection request received from the second host, and, if it is determined that the first host is connectable to the second host, generates a first connection socket connected to the second host for the purpose of data communication. The PCIe dedicated communication module generates a first communication buffer to store data received from the second host, assigns the first communication buffer to the first connection socket, permits the connection between the first and second hosts, and stands by data communication with the second host.

6 Claims, 2 Drawing Sheets

(56) References Cited

FOREIGN PATENT DOCUMENTS

| | | |
|---|---|---|
| KR | 10-2010-0024758 A | 3/2010 |
| WO | 2005/106696 A1 | 11/2005 |
| WO | 2008/095201 A1 | 8/2008 |

\* cited by examiner

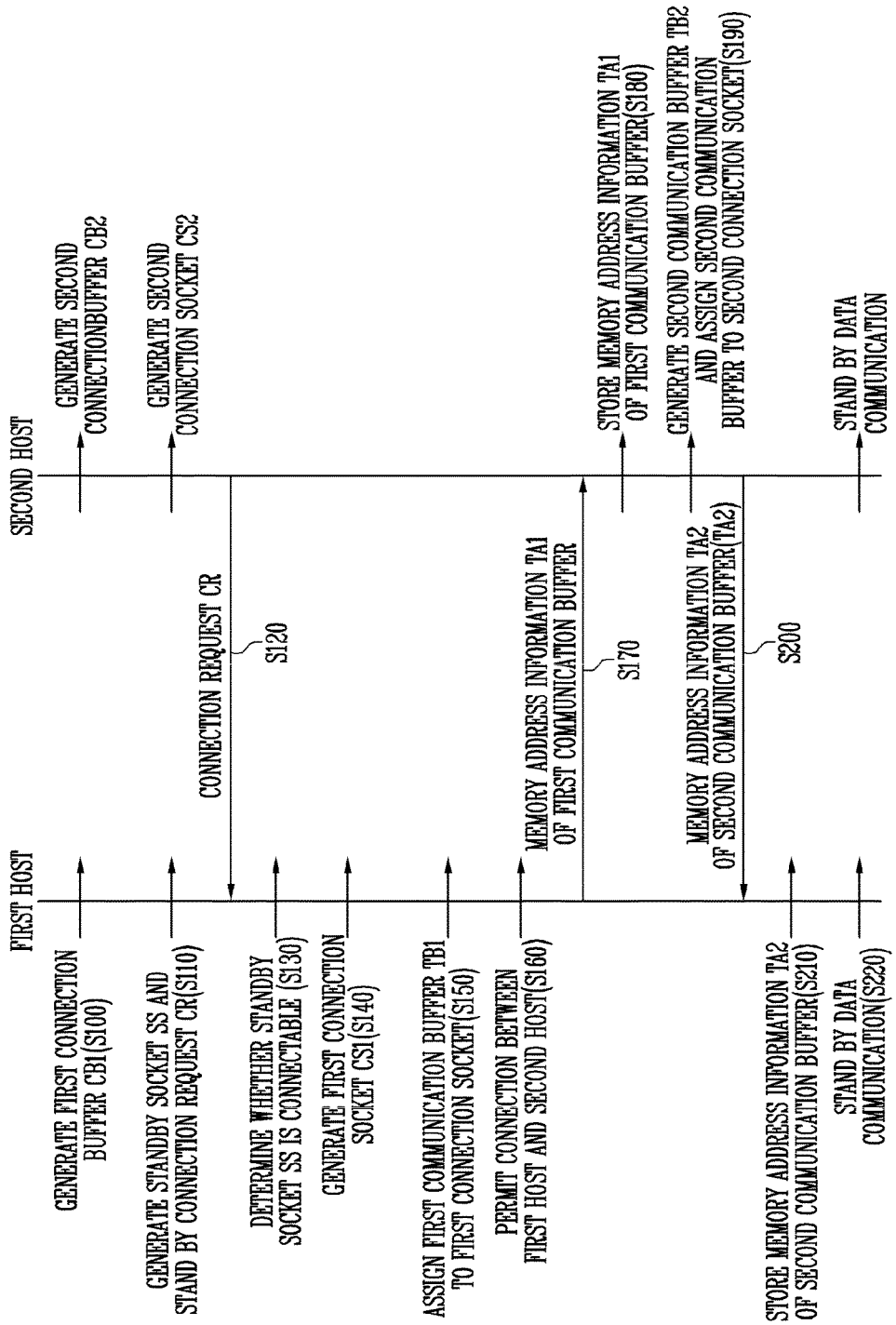

METHOD FOR COMMUNICATION USING PCI EXPRESS DEDICATED COMMUNICATION MODULE AND NETWORK DEVICE INCLUDING THE SAME

CROSS-REFERENCE TO RELATED APPLICATION

The present application claims priority to Korean patent application number 10-2015-0039009, filed on Mar. 20, 2015, the entire disclosure of which is incorporated herein in its entirety by reference.

BACKGROUND

1. Field of Invention

An aspect of the present disclosure relates to a method for communication using a peripheral component interconnect express (PCIe) dedicated communication module. More particularly, an aspect of the present disclosure relates to an operating method of a PCIe dedicated communication module for performing communication between hosts, using a remote memory access function, the PCIe dedicated communication module, and a network device using the same.

2. Description of the Related Art

Computing systems require improved performance, complicated algorithms, and the like so as to provide various services to users. While the performance of processors of the computing systems is continuously improved corresponding to Moore's law, the network connection performance between the computing systems does not catch up with computing performance. Accordingly, the performance of a network in a large-scale, high-performance system has been emerged as one of important variables for determining the performance of the entire system.

Interconnect technology using InfiniBand is widely used in high-performance computing systems. Also, the InfiniBand technology provides a high-speed dedicated network protocol.

In general, peripheral component interconnect express (PCIe) is widely used as a system bus for connection between a processor and an I/O device within a single computing node. Current PCIe shows a performance of 8 Gbps in a single lane. When 16 lanes are used, the PCIe can provide a bandwidth having the maximum performance of 128 Gbps in a single direction. Also, the PCIe can provide high protocol efficiency, the same delay characteristic, low power consumption, low cost, etc., as compared with other network interconnect technologies.

Accordingly, a high-speed dedicated network protocol using the PCIe, corresponding to the performance of hardware, is required in high-performance computing systems.

SUMMARY

Embodiments provide a network device which, in communication using a peripheral component interconnect express (PCIe) network device, has high protocol efficiency, excellent delay characteristic, low power consumption, etc., as compared with the existing network devices using Ethernet, InfiniBand, etc., and is suitable for a high-performance computing system.

Embodiments also provide a network device which can prevent degradation of network performance, caused in TCP/IP protocol processing.

According to an aspect of the present disclosure, there is provided a method for communication between hosts using a PCIe dedicated communication module, the method including: generating, by a PCIe dedicated communication module of a first host, a first connection buffer for receiving a connection command from a second host, and standing by a connection request from the second host; determining, by the PCIe dedicated communication module, whether the first host is connectable to the second host in response to the connection request received from the second host; if it is determined that the first host is connectable to the second host, generating, by the PCIe dedicated communication module, a first connection socket connected to the second host for the purpose of data communication; generating, by the PCIe dedicated communication module, a first communication buffer to store data received from the second host; assigning, by the PCIe dedicated communication module, the first communication buffer to the first connection socket, and permitting the connection between the first host and the second host; and standing by, by the PCIe dedicated communication module, data communication with the second host.

In the standing by of the connection request, the PCIe dedicated communication module may generate a standby socket for connecting to the second host, and stand by the connection request received to the first connection buffer through the standby socket.

The method may further include, if it is determined that the first host is not connectable to the second host, transmitting, by the PCIe dedicated communication module, a connection impossible message to the second host, and standing by a new connection request from the second host.

In the standing by of the data communication, the PCIe dedicated communication module may transmit memory address information of the first communication buffer to the second host, and store memory address information of a second communication buffer, transmitted from the second host.

The method may further include communicating, by the PCIe dedicated communication module, with the second host in response to a data transmission command requested from a network application of the first host.

According to another aspect of the present disclosure, there is provided a PCIe dedicated communication module for communicating with an external host through a network device in response to a data communication command requested from an application, the PCIe dedicated communication module including: a connection buffer configured to store a connection command received from the external host; a connection management unit configured to permit a connection to the external host; a communication buffer configured to store data; and a data communication unit configured to store the data in the communication buffer or transmit the data to the external host in response to the data communication command requested from the application.

The connection management unit may collect hardware information and network address information on the external host and store the collected information in the connection buffer, and generate and manages a socket and a data structure for PCIe communication with the external host.

The connection management unit may read the connection command stored in the connection buffer, and permit the connection to the external host.

According to still another aspect of the present disclosure, there is provided a network device including: a network application configured to request a data communication, using a socket application programming interface (API); a PCIeLink device operated by a PCIeLink device driver, the PCIeLink device being connected to an external host through a PCIe dedicated communication cable; and a PCIe dedicated communication module configured to control data communication through the PCIeLink device, in response to the data communication command of the network application.

The PCIe dedicated communication module may include a connection buffer configured to store a connection command received from the external host; a connection management unit configured to read the connection command stored in the connection buffer, and permit a connection to the external host; a communication buffer configured to store data; and a data communication unit configured to store the data in the communication buffer or transmit the data to the external host in response to the data communication command.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 3 is a flowchart illustrating a method for communication using the PCIe dedicated communication module according to an embodiment of the present disclosure.

DETAILED DESCRIPTION

Figure 1:
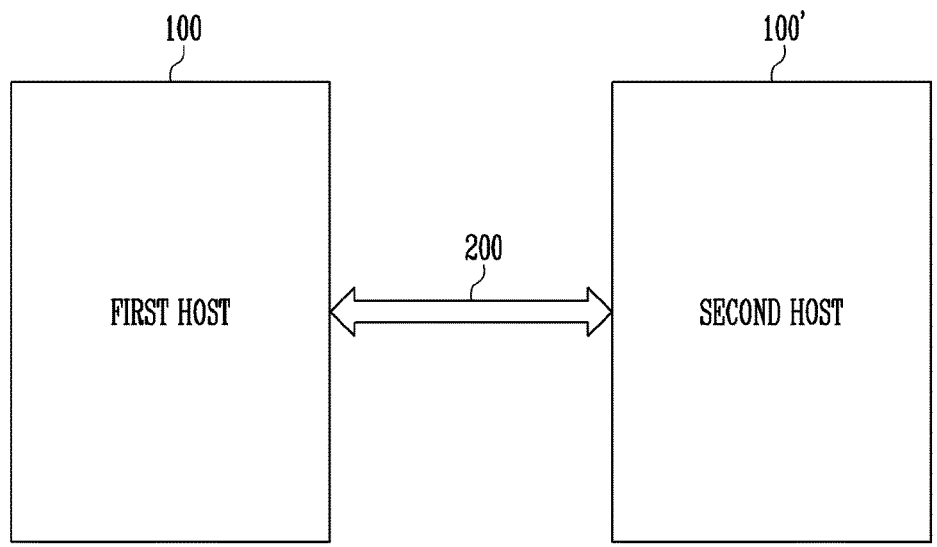
FIG. 1 is a schematic block diagram of hosts which perform communication using a peripheral component interconnect express (PCIe) dedicated communication module according to an embodiment of the present disclosure.

The specific structural or functional description disclosed herein is merely illustrative for the purpose of describing embodiments according to the concept of the present disclosure. The embodiments according to the concept of the present disclosure can be implemented in various forms, and can not be construed as limited to the embodiments set forth herein.

The embodiments according to the concept of the present disclosure can be variously modified and have various shapes. Thus, the embodiments are illustrated in the drawings and are intended to be described herein in detail. However, the embodiments according to the concept of the present disclosure are not construed as limited to specified disclosures, and include all changes, equivalents, or substitutes that do not depart from the spirit and technical scope of the present disclosure.

While terms such as "first" and "second" may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. Meanwhile, other expressions describing relationships between components such as "~ between," "immediately ~ between" or "adjacent to ~" and "directly adjacent to ~" may be construed similarly.

The terms used in the present application are merely used to describe particular embodiments, and are not intended to limit the present disclosure. Singular forms in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

So far as not being differently defined, all terms used herein including technical or scientific terminologies have meanings that they are commonly understood by those skilled in the art to which the present disclosure pertains. The terms having the definitions as defined in the dictionary should be understood such that they have meanings consistent with the context of the related technique. So far as not being clearly defined in this application, terms should not be understood in an ideally or excessively formal way.

Hereinafter, exemplary embodiments of the present disclosure will be described in detail with reference to the accompanying drawings.

FIG. 1 is a schematic block diagram of hosts which perform communication using a peripheral component interconnect express (PCIe) dedicated communication module according to an embodiment of the present disclosure.

Referring to FIG. 1, a first host 100 and a second host 100' may communicate with each other, using a PCIe network device.

Each of the first host 100 and the second host 100' may have a network device including a PCIe dedicated communication module. According to embodiments, the first host 100 and the second host 100' may have the same software stack, and each of the first host 100 and the second host 100' may operate as a server or client according to a user network application included therein.

For example, if the network application included in the first host 100 operates as a server and the network application included in the second host 100' operates as a client, the first host 100 may become the sever to communicate in response to a command from the second host 100' which becomes the client.

In the present disclosure, only the first host 100 and the second host 100' are described for convenience of illustration. However, a plurality of hosts may be connected to each other through a PCIe network device and a dedicated communication cable, and a sever host may communicate with a plurality of client hosts.

The first host 100 and the second host 100' may include a PCIe dedicated communication module that is a dedicated communication module for PCIe communication. The PCIe dedicated communication module may control data communication between the first host 100 and the second host 100'.

A PCIe dedicated communication cable 200 may be connected between the first host 100 and the second host 100'. For example, the PCIe dedicated communication cable 200 may be implemented as a local area network (LAN) cable or a power line communication (PLC) cable, but the present disclosure is not limited thereto.

Figure 2:
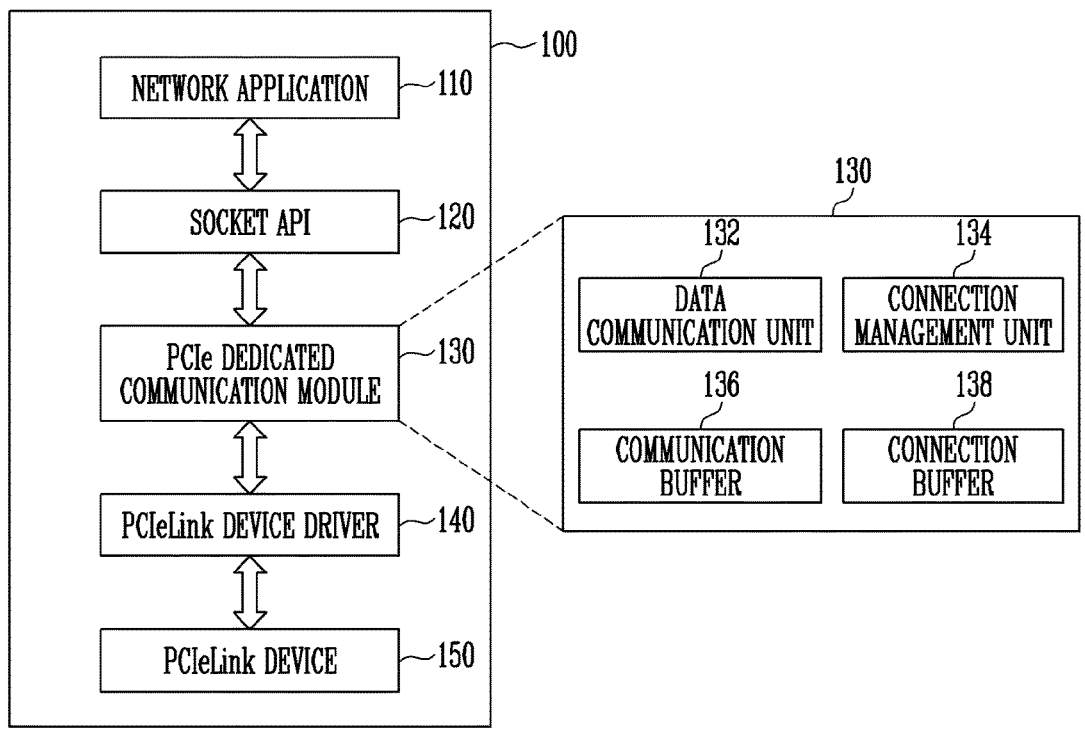
FIG. 2 is a block diagram of a first host including the PCIe dedicated communication module according to an embodiment of the present disclosure.

FIG. 2 is a block diagram of the first host including the PCIe dedicated communication module according to the embodiment of the present disclosure.

Referring to FIGS. 1 and 2, the first host 100 may include a network application 110, a socket application programming interface (API) 120, a PCIe dedicated communication module 130, a PCIeLink device driver 140, and a PCIeLink device 150.

The network application 110 may operate as a server or client according to a user's selection. For example, if the network application 110 of the first host 100 is set as a server, the first host 100 may communicate as the server with hosts.

According to embodiments, the second host 100' may include the same configuration and software as the first host 100.

The socket API 120 may generate a socket structure under control of the PCIe dedicated communication module 130 so as to communicate with other hosts.

The PCIe dedicated communication module 130 may be a processing module which performs communication through the socket API 120 in response to a data communication command of the network application 110. For example, if the network application 110 calls the socket API 120 for the purpose of communication, the PCIe dedicated communication module 130 may communicate with external hosts connected using the socket structure generated with respect to a PCIe protocol.

The PCIe dedicated communication module 130 may include a data communication unit 132, a connection management unit 134, a communication buffer 136, and a connection buffer 138.

The data communication unit 132 may store, in the communication buffer 136, data transmitted from the outside through the PCIeLink device 150, or may transmit the stored data to external hosts through the PCIeLink device 150.

The connection management unit 134 may collect, from the PCIeLink device driver 140, PCIeLink device information and virtual network address information on the first host 100 and the second host 100' to be connected thereto.

The connection management unit 134 may generate a socket structure for PCIe communication. The connection management unit 134 may generate a data structure for communicating with an external host. For example, the connection management unit 134 may generate and manage a connection standby queue so as to respond to a connection request from an external host.

The connection management unit 134 may generate the connection buffer 138, using a remote memory access function of the PCIeLink device 150. Also, the connection management unit 134 may generate the communication buffer 136 for data communication.

That is, the connection management unit 134 may store and process connection requests between hosts, using the connection buffer 138. The connection management unit 134 may generate the communication buffer 136 for data communication and provide the generated communication buffer 136 to the data communication unit 132.

The PCIeLink device driver 140 is a device driver module which can connect PCIe dedicated communication module 130 and the PCIeLink device 150 to each other, and control the PCIeLink device 150.

The PCIeLink device 150 may remotely change and manage a target memory between hosts, using the remote memory access function. Also, the PCIeLink device 150 may process a connection command, data communication commands, and the like, which are requested from the PCIe dedicated communication module 130, by controlling a direct memory access (DMA), a memory copy, a doorbell register, or the like.

FIG. 3 is a flowchart illustrating a method for communication using the PCIe dedicated communication module according to the embodiment of the present disclosure.

Referring to FIGS. 1 to 3, the network application 110 of the first host 100 may operate as a server, and the network application 110 of the second host 100' may operate as a client.

The PCIe dedicated communication module 130 of the first host 100 may generate a first connection buffer CB1 to store a connection command received from the second host 100' (S100), and stand by a connection request CR by generating a standby socket SS to receive the connection command from the second host 100' (S110).

For example, the standby socket SS may be connected to the first connection buffer CB1, and the PCIe dedicated communication module 130 may process the connection command through the first connection buffer CB1 according to the connection request CR from the second host 100'.

Like the first host 100, the second host 100' may generate a second connection buffer CB2 and a second connection socket CS2 so as to be connected to the first host 100.

If the connection request CR is received from the second host 100' (S120), the PCIe dedicated communication module 130 may determine whether the standby socket SS is connectable (S130).

For example, the first host may be connected as the server to a plurality of client hosts. The first host 100 may communicate with a hosts selected according to one of a plurality of connection requests received from other hosts.

If it is determined that the first host 100 is connectable to the second host 100' according to the connection request CR received from the second host 100', the PCIe dedicated communication module 130 may generate a first connection socket CS1 connected to the second connection socket CS2 of the second host 100' (S140).

According to embodiments, if it is determined that the first host 100 is not connectable to the second host 100', the PCIe dedicated communication module 130 may transmit a connection impossible message to the second host 100', and stand by a new connection request from the second host 100'.

The PCIe dedicated communication module 130 may generate a first communication buffer TB1 to store data to be received from the second host 100' through the first connection socket CS1, and assign the generated first communication buffer TB1 to the first connection socket CS1 (S150).

The PCIe dedicated communication module 130 may permit the connection between the first host 100 and the second host 100' (S160), and transmit memory address information TA1 of the first communication buffer TB1 to the second host 100' (S170).

The PCIe dedicated communication module 130 of the second host 100' may store the memory address information TA1 of the first communication buffer TB1 (S180), generate a second communication buffer TB2 to store data to be received from the first host 100, and assign the generated second communication buffer TB2 to the second connection socket CS2 (S190).

The PCIe dedicated communication module 130 may receive memory address information TA2 of the second communication buffer TB2 from the second host 100'

(S200), and store the received memory address information TA2 of the second communication buffer TB2 (S210).

Finally, the PCIe dedicated communication module 130 of the first host 100 and the PCIe dedicated communication module 130 of the second host 100' may stand by data communication (S220).

Accordingly, the first host 100 can store data received from the second host 100' in the first communication buffer TB1, and read data stored in the first communication buffer TB1. Further, the second host 100' can store data received from the first host 100 in the second communication buffer TB2, and read data store in the second communication buffer TB2.

As described above, the PCIe dedicated communication module and the network device including the same according to the present disclosure can have high protocol efficiency, excellent delay characteristic, low power consumption, etc., as compared with the existing network devices using Ethernet, InfiniB and, etc., and provide an efficient networking environment in a high-performance computing system which requires large-capacity data transmission.

Further, the PCIe dedicated communication module and the network device including the same according to the present disclosure can minimize transmission delay by providing a dedicated communication module capable of reducing overhead in TCP/IP processing, and support a bandwidth corresponding to the bandwidth supported by PCIe devices.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A method for communication between hosts using a peripheral component interconnect express (PCIe) dedicated communication module, the method comprising:

generating, by a PCIe dedicated communication module of a first host, a first connection buffer for receiving a connection command from a second host, and standing by a connection request from the second host;

determining, by the PCIe dedicated communication module, whether the first host is connectable to the second host in response to the connection request received from the second host;

generating, by the PCIe dedicated communication module, a first connection socket connected to the second host for the purpose of data communication if it is determined that the first host is connectable to the second host;

generating, by the PCIe dedicated communication module, a first communication buffer to store data received from the second host;

assigning, by the PCIe dedicated communication module, the first communication buffer to the first connection socket, and in response permitting the connection between the first host and the second host; and standing by data communication between the first host and the second host.

2. The method of claim 1, wherein the standing by the connection request from the second host, generates a standby socket for connecting to the second host, and stands by the connection request received by the first connection buffer through the standby socket.

3. The method of claim 1, further comprising, transmitting, by the PCIe dedicated communication module, a connection impossible message to the second host if it is determined that the first host is not connectable to the second host, and standing by a new connection request from the second host.

4. The method of claim 1, wherein, the standing by the data communication, transmits memory address information of the first communication buffer to the second host, and stores memory address information of a second communication buffer, transmitted from the second host.

5. The method of claim 1, further comprising, communicating, by the PCIe dedicated communication module, with the second host in response to a data transmission request received from a network application of the first host.

6. A non-transitory computer-readable recording medium for recording a computer program for executing the method of claim 1.

* * * * *